United States Patent
Yokomizo et al.

(10) Patent No.: US 10,745,630 B2
(45) Date of Patent: Aug. 18, 2020

(54) STAGED INTRODUCTION OF ADDITIVES IN SLURRY HYDROCRACKING PROCESS

(71) Applicant: UOP LLC, Des Plaines, IL (US)

(72) Inventors: Grant H. Yokomizo, Mount Prospect, IL (US); Daniel J. Pintar, Hoffman Estates, IL (US); Gavin P. Towler, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 37 days.

(21) Appl. No.: 15/997,584

(22) Filed: Jun. 4, 2018

(65) Prior Publication Data
US 2018/0282639 A1    Oct. 4, 2018

Related U.S. Application Data

(63) Continuation of application No. PCT/US2016/063120, filed on Nov. 21, 2016.
(Continued)

(51) Int. Cl.
*C10G 51/02*    (2006.01)
*C10G 47/26*    (2006.01)
(Continued)

(52) U.S. Cl.
CPC .......... *C10G 51/026* (2013.01); *B01J 8/0015* (2013.01); *C10G 47/26* (2013.01); *C10G 65/10* (2013.01);
(Continued)

(58) Field of Classification Search
CPC ...... C10G 51/026; C10G 65/10; C10G 47/26; C10G 2300/80; C10G 2300/708;
(Continued)

(56) References Cited

U.S. PATENT DOCUMENTS

| 4,762,607 A | 8/1988 | Aldridge et al. |
| 2011/0017636 A1 | 1/2011 | Nguyen et al. |

(Continued)

FOREIGN PATENT DOCUMENTS

| WO | 2009058785 A2 | 5/2009 |
| WO | 2014133608 A1 | 9/2014 |

OTHER PUBLICATIONS

Examination Report dated Aug. 16, 2019 for corresponding Indian Application No. 201817019174.

*Primary Examiner* — Randy Boyer
*Assistant Examiner* — Juan C Valencia
(74) *Attorney, Agent, or Firm* — Paschall & Associates, LLC; James C. Paschall

(57) ABSTRACT

A method of reducing catalyst agglomeration in a slurry hydrocracking zone containing at least two reactors is described. A hydrocarbon feed and a slurry hydrocracking catalyst are contacted in a first reactor to form a first effluent containing slurry hydrocracking reaction products, unreacted hydrocarbon feed, and the slurry hydrocracking catalyst, wherein the slurry hydrocracking catalyst agglomerates. The first effluent and an unsupported hydrogenation catalyst are contacted in a second reactor to form a second effluent containing the slurry hydrocracking reaction products, unreacted hydrocarbon feed, the slurry hydrocracking catalyst, and asphaltene reaction products.

17 Claims, 1 Drawing Sheet

Related U.S. Application Data

(60) Provisional application No. 62/270,222, filed on Dec. 21, 2015.

(51) Int. Cl.
| | | |
|---|---|---|
| *C10G 65/10* | (2006.01) | |
| *B01J 8/00* | (2006.01) | |
| *B01J 23/28* | (2006.01) | |
| *B01J 23/30* | (2006.01) | |
| *B01J 23/40* | (2006.01) | |

(52) U.S. Cl.
CPC ............... *B01J 23/28* (2013.01); *B01J 23/30* (2013.01); *B01J 23/40* (2013.01); *C10G 2300/206* (2013.01); *C10G 2300/708* (2013.01); *C10G 2300/80* (2013.01)

(58) Field of Classification Search
CPC ... C10G 2300/206; B01J 8/0015; B01J 23/30; B01J 23/40; B01J 23/28
See application file for complete search history.

(56) References Cited

U.S. PATENT DOCUMENTS

| | | | |
|---|---|---|---|
| 2011/0049010 A1* | 3/2011 | Abdel-Halim | C10G 47/26 208/59 |
| 2012/0234726 A1* | 9/2012 | Morel | B01J 27/30 208/49 |
| 2014/0238897 A1* | 8/2014 | Kou | C10G 65/10 208/59 |

\* cited by examiner

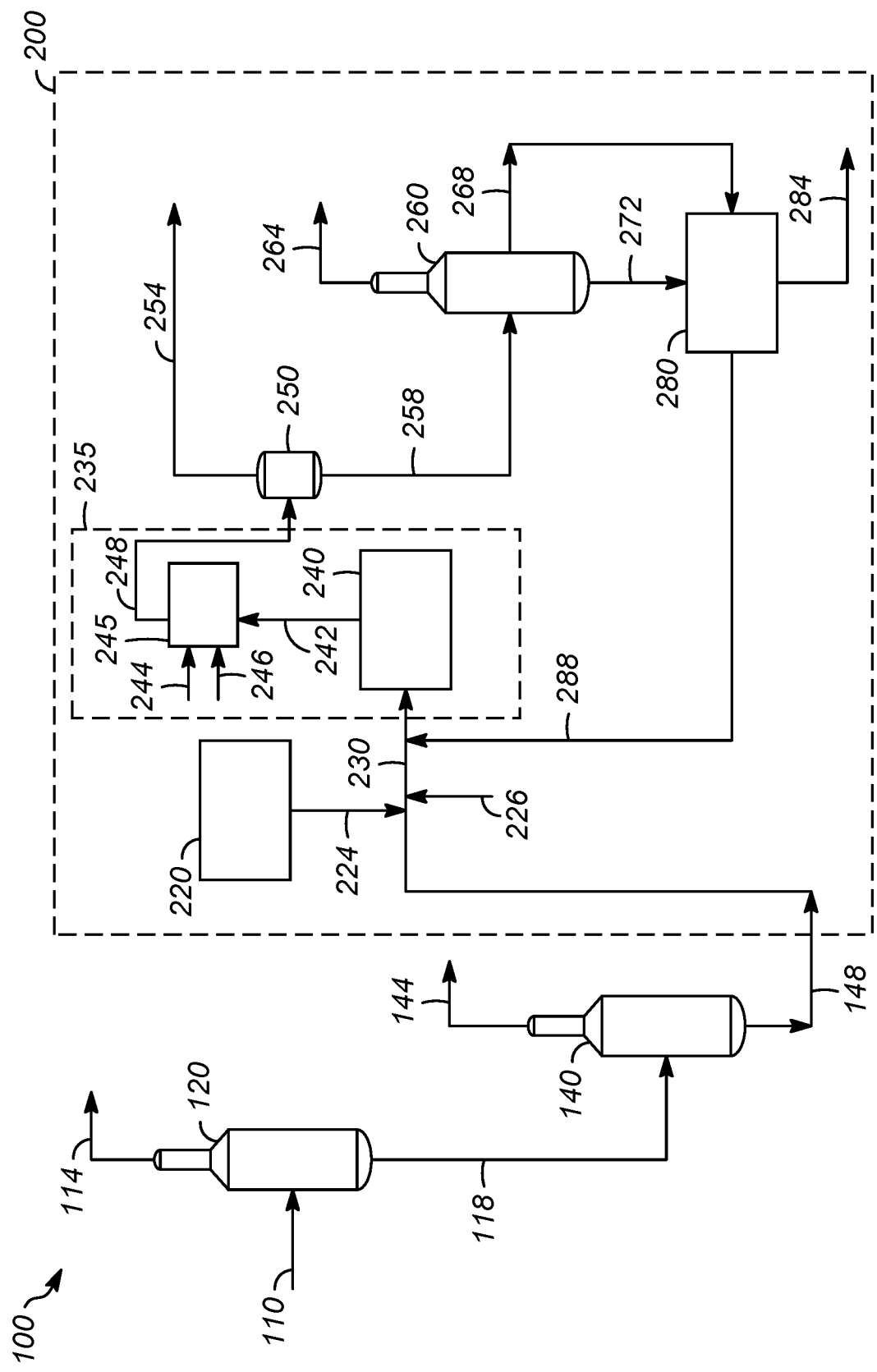

STAGED INTRODUCTION OF ADDITIVES IN SLURRY HYDROCRACKING PROCESS

CROSS-REFERENCE TO RELATED APPLICATIONS

This application is a Continuation of International Application No. PCT/US2016/063120 filed Nov. 21, 2016, which application claims priority from U.S. Provisional Application No. 62/270,222 filed Dec. 21, 2015, the contents of which cited applications are hereby incorporated by reference in their entirety.

BACKGROUND OF THE INVENTION

As the reserves of conventional crude oils decline, heavy oils must be upgraded to meet world demands. In heavy oil upgrading, heavier materials are converted to lighter fractions and most of the sulfur, nitrogen and metals must be removed. Heavy oils include materials such as petroleum crude oil, atmospheric tower bottoms products, vacuum tower bottoms products, heavy cycle oils, shale oils, coal derived liquids, crude oil residuum, topped crude oils and the heavy bituminous oils extracted from oil sands. These heavy hydrocarbon feedstocks may be characterized by low reactivity in visbreaking, high coking tendency, poor susceptibility to hydrocracking and difficulties in distillation. Most residual oil feedstocks which are to be upgraded contain some level of asphaltenes which are typically understood to be heptane insoluble compounds as determined by ASTM D3279 or ASTM D6560. Asphaltenes are high molecular weight compounds containing heteroatoms which impart polarity.

Heavy oils must be upgraded in a primary upgrading unit before they can be further processed into useable products. Primary upgrading units known in the art include, but are not restricted to, coking processes, such as delayed or fluidized coking, and hydrogen addition processes such as ebullated bed or slurry hydrocracking (SHC).

In SHC, a three-phase mixture of heavy liquid oil feed cracks in the presence of gaseous hydrogen over solid catalyst particles (e.g., as a particulate metallic compound such as a metal sulfide) in a slurry phase to produce lighter products under pressure at an elevated temperature. Representative slurry hydrocracking processes are described, for example, in U.S. Pat. Nos. 5,755,955 and 5,474,977.

Some SHC catalysts may agglomerate in later reactors which reduces their effectiveness.

Thus, there is a need for methods of reducing the agglomeration of SHC catalysts.

BRIEF DESCRIPTION OF THE DRAWING

The FIGURE illustrates a refining apparatus including a slurry hydrocracking apparatus according to the present invention.

SUMMARY OF THE INVENTION

One aspect of the invention is a method of reducing catalyst agglomeration in a slurry hydrocracking zone containing at least two reactors in series. In one embodiment, the method includes contacting a hydrocarbon feed and a slurry hydrocracking catalyst in a first reactor under first slurry hydrocracking conditions to form a first effluent containing slurry hydrocracking reaction products, unreacted hydrocarbon feed, and the slurry hydrocracking catalyst, wherein the slurry hydrocracking catalyst agglomerates; and contacting the first effluent and an unsupported hydrogenation catalyst in a second reactor under second slurry hydrocracking conditions to form a second effluent containing the slurry hydrocracking reaction products, unreacted hydrocarbon feed, the slurry hydrocracking catalyst, and asphaltene reaction products.

DETAILED DESCRIPTION OF THE INVENTION

Slurry hydrocracking of heavy oil has optimal payback at high conversions of vacuum residues to fuels. The SHC process can include one or more reactors. When more than one reactor is used, some SHC catalysts, such as metal compound comprising a metal of Groups IVB, VB, VIB, VIIB, and VIII, agglomerate during the process. The catalyst agglomeration can cause catalyst settling in the reactor and/or cause the catalyst to start accumulating in the reactor causing the slurry bed to collapse. It has been discovered that the agglomeration can be reduced by including an unsupported hydrogenation catalyst in the second or later reactor.

In addition to the agglomeration problem, various additives and catalysts can be used to mitigate coking and fouling in SHC. The additives and catalysts have different mechanisms for preventing coking. Each mechanism has optimal conditions in which the highest efficacy is observed. However, for reactors in series, the additive must travel through all the reactors experiencing a variety of operating conditions. Overall SHC performance can be improved if each additive operated in its optimal environment. Different slurry catalysts or additives can be injected into different SHC reactors arranged in series. For reactors in series, with or without interstage separation, the operating condition in each reactor can be optimized for the additive injected in that stage. By injection of an expensive additive into a reactor with optimal conditions for that additive, both the amount of additive and the extent of fouling can be minimized.

For example, some additives perform optimally at high concentrations of coke precursors. For example, coke precursor trapping catalysts are more efficient at high coke precursor concentrations. By injecting those additives at later stages in the reactor series, both the amount of additive used on a fresh feed basis and the effectiveness of the additive are optimized. In contrast, the first reactor in series has a lower concentration of coke precursors than following reactors. At the lower concentration of coke precursors, the catalyst does not agglomerate. The addition of an expensive hydrogenation catalysts in the first reactor in series would be insufficient to prevent the catalyst agglomeration which would occur in following reactors. The more expensive coke precursor trapping or growth impeding additives can be used in later stages. Suitable growth impeding additives are unsupported hydrogenation catalysts, such as metal or metal compounds of molybdenum, tungsten, nickel, platinum, or palladium. Suitable coke precursor trapping catalysts include, but are not limited to, porous clays, carbons, or oxides, and high surface area carbon, silica, or alumina (e.g., about 50 $m^2$/g to about 500 $m^2$/g or more).

The FIGURE illustrates an exemplary refining apparatus 100 including a slurry hydrocracking apparatus 200. The refining apparatus can include a line 110 providing a feed, such as a crude oil, to an atmospheric fractionation zone 120. The lines in the drawing may be referred to interchangeably as feeds, effluents, streams, or lines.

The atmospheric fractionation zone 120 can produce one or more overhead streams 114 and an atmospheric bottom stream 118. The one or more overhead streams 114 can include a variety of products, such as light gases, gasoline, diesel, and kerosene. These one or more overhead streams 114 can exit the atmospheric fractionation zone 120 separately or in combination. The atmospheric bottom stream 118 can typically include a heavy hydrocarbon boiling at or above about 340° C. The atmospheric bottom stream 118 can be provided to a first vacuum fractionation zone 140. The first vacuum fractionation zone 140 can, in turn, provide an overhead stream 144 and a vacuum bottom stream 148. Typically, the overhead stream 144 can include one or more compounds boiling above about 300° C. The vacuum bottom stream 148 can include material boiling above about 500° C. This vacuum bottom stream 148 can be provided as a portion of a feed 230 to the slurry hydrocracking apparatus 200. Although the vacuum bottom stream 148 is depicted as being provided to the slurry hydrocracking apparatus 200, it should be known that any suitable feed in any combination could be provided, such as a vacuum gas oil, a vacuum residue, or a fluidized catalytic cracking gas oil boiling, respectively, above about 425° C., above about 510° C., or above about 400° C. Generally, any suitable portion of the feed 230 can be provided to the slurry hydrocracking apparatus 200 that may have, e.g., about 90%, by weight, boiling above a temperature of at least about 300° C. at an atmospheric equivalent boiling point as calculated from observed boiling temperature and distillation pressure, as determined by ASTM D1160-06. Such a feed portion can have an API gravity of no more than about 20°, and typically no more than about 10°.

The slurry hydrocracking apparatus 200 can include a catalyst sizing zone 220, a slurry hydrocracking reaction zone 235, a hot, high pressure separation zone 250, a second fractionation zone 260, and a separation zone 280. Generally, the catalyst sizing zone 220 can have any suitable apparatus for shaping catalytic material to any suitable size, such as a mean catalyst particle size of about 2 to about 100 microns, preferably about 2 to about 20 microns, as determined by the dry method as disclosed in, e.g., U.S. 2009/0321314 A1. In other exemplary embodiments, the mean catalyst particle size can be about 10 to about 100 microns. Typically, the catalyst sizing zone 220 can include any suitable mill to grind catalytic material to particles having a mean particle diameter of about 2 to about 100 microns. Usually, any suitable material can be utilized having suitable catalyst dimensions.

Catalytically active metals for use in SHC include those from Group IVB, Group VB, Group VIB, Group VIIB, or Group VIII of the Periodic Table, which are incorporated in the heavy hydrocarbon feedstock in amounts effective for catalyzing desired hydrotreating and/or hydrocracking reactions to provide, for example, lower boiling hydrocarbons that may be fractionated from the SHC effluent as naphtha and/or distillate products in the substantial absence of the solid particulate. Representative metals include iron, nickel, molybdenum, vanadium, tungsten, cobalt, ruthenium, and mixtures thereof. The catalytically active metal may be present as a solid particulate in elemental form or as an organic compound or an inorganic compound such as a sulfide (e.g., iron sulfide) or other ionic compound. Metal or metal compound nanoaggregates may also be used to form the solid particulates. Often, it is desired to form such metal compounds, as solid particulates, in situ from a catalyst precursor such as a metal sulfate (e.g., iron sulfate monohydrate) that decomposes or reacts in the SHC reaction zone environment, or in a pretreatment step, to form a desired, well-dispersed and catalytically active solid particulate (e.g., as iron sulfide). Precursors also include oil-soluble organo-metallic compounds containing the catalytically active metal of interest that thermally decompose to form the solid particulate (e.g., iron sulfide) having catalytic activity. Such compounds are generally highly dispersible in the heavy hydrocarbon feedstock and normally convert under pretreatment or SHC reaction zone conditions to the solid particulate that is contained in the slurry effluent. An exemplary in situ solid particulate preparation, involving pretreating the heavy hydrocarbon feedstock and precursors of the ultimately desired metal compound, is described, for example, in U.S. Pat. No. 5,474,977.

Other suitable precursors include metal oxides that may be converted to catalytically active (or more catalytically active) compounds such as metal sulfides. In a particular embodiment, a metal oxide containing mineral may be used as a precursor of a solid particulate comprising the catalytically active metal (e.g., iron sulfide) on an inorganic refractory metal oxide support (e.g., alumina).

As an example, exemplary catalyst compounds can include a catalytically effective amount of one or more compounds having iron. Particularly, the one or more compounds can include at least one of an iron oxide, an iron sulfate, and an iron carbonate. Other forms of iron can include at least one of an iron sulfide, a pyrrhotite, and a pyrite. What is more, the catalyst can contain materials other than an iron, such as at least one of molybdenum, nickel, and manganese, and/or a salt, an oxide, and/or a mineral thereof.

Preferably, the one or more compounds includes an iron sulfate, and more preferably at least one of an iron sulfate monohydrate and an iron sulfate heptahydrate. Oxidic iron-containing compounds obtained from sources such as a limonite, a laterite, a wrought iron, a clay, a magnetite, a hematite, a gibbsite, or a Kisch iron can also be used. One particularly desired material is ferrous sulfate. The ferrous sulfate can either be a monohydrate or a heptahydrate.

Desirably, one or more catalyst particles can include about 2 to about 45%, by weight, iron oxide and about 20 to about 90%, by weight, alumina. In one exemplary embodiment, iron-containing bauxite is a preferred material having these proportions. Bauxite can have about 10 to about 40%, by weight, iron oxide ($Fe_2O_3$), and about 54 to about 84%, by weight, alumina and may have about 10 to about 35%, by weight, iron oxide and about 55 to about 80%, by weight, alumina. Bauxite also may include silica ($SiO_2$) and titania ($TiO_2$) in amounts of usually no more than about 10%, by weight, and typically in amounts of no more than about 6%, by weight. Volatiles such as water and carbon dioxide may also be present, but the foregoing weight proportions exclude such volatiles. Iron oxide is also present in bauxite in a hydrated form, but again the foregoing proportions exclude water in the hydrated composition.

In another exemplary embodiment, it may be desirable for the catalyst to be supported. Such a supported catalyst can be relatively resilient and maintain its particle size after being processed through the slurry hydrocracking reaction zone 235. As a consequence, such a catalyst can include a support of alumina, silica, titania, one or more aluminosilicates, magnesia, bauxite, coal and/or petroleum coke. Such a supported catalyst can include a catalytically active metal, such as at least one of iron, molybdenum, nickel, and vanadium, as well as sulfides of one or more of these metals. Generally, the catalyst can have about 0.01 to about 30%, by weight, of the catalytic active metal based on the total weight of the catalyst.

Generally, it is desirable to have a catalyst of sufficient size to allow it to be readily filtered, centrifuged, settled, or otherwise separated from an unconverted pitch, as hereinafter described. If the catalyst is too small, separation may be difficult. As a consequence, it is desirable for the catalyst to be of a minimum dimension.

Ground catalysts of suitable size can be communicated via a line 224 from the catalyst sizing zone 220 and be combined with the vacuum bottom stream 148. Afterwards, hydrogen may be provided via a line 226 to form the feed 230 for the slurry hydrocracking reaction zone 235. Generally, the hydrogen in the line 226 can include recycled and/or make-up hydrogen, and as such can include other light hydrocarbon molecules, such as methane and ethane.

The slurry hydrocracking reaction zone 235 can receive the feed 230 and a recycle stream from a line 288, as hereinafter described, and provide an effluent 248. Generally, the slurry hydrocracking reaction zone 235 can include two reactors 240, 245 (as shown) in series operating either in up-flow or down-flow. In some embodiments, there can be more than two reactors. One exemplary reactor can be a tubular reactor through which the feed, catalyst, and gas pass upwardly. Generally, the temperature can be about 400° C. to about 575° C., or about 440° C. about 465° C., and a pressure of about 3 to about 30 MPa, or about 10 to about 30 MPa, or about 3 to about 25 MPa, or about 10 to about 25 MPa. The liquid hourly space velocity is typically below about 4 $hr^{-1}$, or below about 1 $hr^{-1}$.

The catalyst and conditions used in the SHC reaction zone are suitable for upgrading the heavy hydrocarbon feedstock to provide a lower boiling component in the SHC effluent exiting the SHC reaction zone.

The effluent 242 from the first reactor 240 includes the slurry hydrocracking reaction products, unreacted hydrocarbon feed, and the SHC catalyst.

The effluent 242 from the first reactor 240 is sent to the second reactor 245. An unsupported hydrogenation catalyst 244 is introduced into the second reactor 245. The unsupported hydrogenation catalyst helps to prevent the agglomeration of the SHC catalyst. Suitable unsupported hydrogenation catalysts include, but are not limited to, at least one of molybdenum, tungsten, nickel, platinum, or palladium. The unsupported hydrogenation catalyst can be a metal or a metal compound. The unsupported hydrogenation catalyst can be included in an amount of about 10 ppmw to about 1000 ppmw.

A first additive 246 can also be included in the second reactor 245. The first additives include, but are not limited to, asphaltene trapping additives, antifoaming agents, coalescence preventing additives, metal trapping additives, and mesogen trapping additives. Suitable first additives can include, but are not limited to, at least one of a supported or unsupported Group VIB or Group VIM based hydrogenation additive (e.g., molybdenum, tungsten, or rhenium), high surface area carbon, high surface area silica, and high surface area porous clay. The first additive can be included in an amount of about 10 ppmw to 1000 ppmw or alternatively between 0.5 wt % and 5 wt %.

In some embodiments, there can be three or more reactors in series (not shown). The first additive can also be added to the third (or later) reactor in the series. This may be desirable due to the increasing concentration of coke precursors due to the conversion of the reactor liquid to gaseous products.

In addition, a second additive can be added into the third (or later) reactor. Suitable second additives can include, but are not limited to at least one of a high surface area carbon, silica, or alumina, and an oil soluble material containing at least one of Mo, W, and Ni. The second additive can be included in an amount of about 10 ppmw to about 10,000 ppmw.

The effluent 248 of the second reactor 245 contains the slurry hydrocracking reaction products from the first and second reactors, unreacted hydrocarbon feed, the slurry hydrocracking catalyst, asphaltene reaction products, the unsupported hydrogenation catalyst, and any additives that have been added to the reactors.

The gas-liquid mixture or fluid effluent 248 is withdrawn and provided to a hot, high pressure separation zone 250. The hot, high pressure separation zone 250 can include a separator operating at a temperature of about 200° C. to about 470° C. and a pressure of about 3 MPa to about 25 MPa, or about 10 MPa to about 18 MPa. Generally, a first fluid stream 254 including naphtha can be withdrawn. The first fluid stream 254 may include about 35% to about 80%, by volume, of the hydrocarbon product from the slurry hydrocracking reaction zone 235 as well as hydrogen. The hydrogen can be recovered and optionally recycled to be comprised in the line 226. A second fluid stream 258 can be provided to the second fractionation zone 260. The second fractionation zone 260 can be an atmospheric fractionator, a vacuum fractionator, or a stripper fractionator, for example.

Usually, the second fractionation zone 260 can include a vacuum fractionation column that can be operated at any suitable temperature to provide an atmospheric equivalent cut point between a light vacuum gas oil and a heavy vacuum gas oil of about 250-about 565° C. In addition, the vacuum fractionation column can be operated at a pressure of about 1 kPa to about 10 kPa. Generally, the vacuum distillation column can provide a light vacuum gas oil in a line 264, a heavy vacuum gas oil in a line 268, and a mixture including a pitch or a vacuum residue and at least a part or all of the slurry hydrocracking catalyst in a line 272. Typically, the light vacuum gas oil can have a boiling point of about 230° C. to about 450° C., the heavy vacuum gas oil can have a boiling point range of about 260° C. to about 500° C., and the pitch or vacuum residue can have an initial boiling point of at least about 525° C. Generally, the catalyst from the second fractionation zone 260 concentrates in the pitch to form the mixture withdrawn through the line 272. The mixture may include no more than about 40%, no more than about 30%, or even no more than about 20%, by weight, of catalyst with respect to the total weight of pitch and catalyst in the line 272. The mixture in the line 272 can be provided to the separation zone 280.

The separation zone 280 can include any suitable device for separating the pitch from the slurry hydrocracking catalyst. The pitch can be separated by using filtering, centrifuging, magnetic separation, electrostatic separation, cyclones, or settling. In one exemplary filtration system, a vessel can form an upper chamber and a lower chamber. The mixture in the line 272 can be provided to the bottom chamber with the filtrate exiting an upper chamber. The vessel can contain a plate forming a plurality of apertures with corresponding filter modules coupled at the apertures descending therefrom, thereby forming a filter candle assembly. Such a filter system is available from Filtrex Systems of Attleboro, Mass.

Usually, if a filter system is utilized, the filter system can be operated at any suitable temperature, such as about 300° C. about 450° C. Typically, an effective temperature is selected to ensure that the pitch is in a liquid phase and has a sufficiently low viscosity to allow efficient filtration. Generally, the filter system can provide a filtrate, which is typically the pitch substantially absent of the slurry hydrocarbon catalyst, e.g., no more than about 1%, by weight, the slurry hydrocarbon catalyst, and a retentate typically including the slurry hydrocarbon catalyst. Generally, when using a filter system, the filter system can be backwashed, for example, by providing at least a part of the heavy vacuum gas oil from the line 268 to the upper chamber to flush out the retentate. The retentate can be discharged through the line 288 while the filtrate containing the pitch substantially absent of the catalyst can be discharged as a product via a line 284.

Typically, the retentate can include a suspension having the catalyst and a heavy vacuum gas oil from the line 268. The suspension in the line 288 can include the catalyst entrained in the heavy vacuum gas oil. The recycle stream including the suspension can include at least about 5%, by weight, of the catalyst based on the total weight of the catalyst and a fluid, typically the heavy vacuum gas oil. Moreover, the recycle stream can recover at least about 50%, preferably at least about 80%, by weight, of the catalyst present in the mixture in the line 272 prior to entering the separation zone 280. This material can be recycled through the line 288 as a recycle stream to or upstream of the slurry hydrocracking reaction zone 235. As depicted, the recycle stream can be provided downstream of the lines 224 and 226 and upstream of the slurry hydrocracking reaction zone 235. In this manner, the slurry hydrocracking catalyst can be recycled directly or indirectly back to the slurry hydrocracking reaction zone 235 without being cleaned or otherwise rejuvenated or regenerated. In other exemplary embodiments, other backwash fluid streams may be used additionally or alternatively to the recycle stream, such as any suitable gas oil, such as light or heavy gas oils. Such suitable oils may include toluene, one or more xylenes, light cycle oil, medium cycle oil, or any combination thereof.

Generally, in the catalyst sizing zone 220, the catalyst can be sized by utilizing any suitable device, such as a mill, to produce a catalyst having the requisite size of about 2 to about 100 microns. Alternatively, an ungrounded catalyst may be utilized, such as an ungrounded bauxite. Typically, an ungrounded catalyst is of suitable size as to be easily separated from a mixture including, e.g., at least one hydrocarbon, such as pitch. In addition, utilizing a backwash material such as a heavy vacuum gas oil can allow the catalyst and the heavy vacuum gas oil to be recycled back to the slurry hydrocarbon reaction zone and thus can lower or possibly nearly eliminate the need for make-up slurry hydrocarbon catalyst as well as efficiently recycling the catalyst.

As used herein, "about" is understood to mean within 10% of the value, or within 5%, or within 1%.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

Specific Embodiments

While the following is described in conjunction with specific embodiments, it will be understood that this description is intended to illustrate and not limit the scope of the preceding description and the appended claims.

A first embodiment of the invention is a method of reducing catalyst agglomeration in a slurry hydrocracking zone containing at least two reactors in series comprising contacting a hydrocarbon feed and a slurry hydrocracking catalyst in a first reactor under first slurry hydrocracking conditions to form a first effluent containing slurry hydrocracking reaction products, unreacted hydrocarbon feed, and the slurry hydrocracking catalyst, wherein the slurry hydrocracking catalyst agglomerates; and contacting the first effluent and an unsupported hydrogenation catalyst in a second reactor under second slurry hydrocracking conditions to form a second effluent containing the slurry hydrocracking reaction products, unreacted hydrocarbon feed, the slurry hydrocracking catalyst, and asphaltene reaction products. An embodiment of the invention is one, any or all of prior embodiments in this paragraph up through the first embodiment in this paragraph wherein the slurry hydrocracking catalyst comprises a metal compound comprising a metal of Groups IVB, VB, VIB, VIIB, and VIII. An embodiment of the invention is one, any or all of prior embodiments in this paragraph up through the first embodiment in this paragraph wherein the unsupported hydrogenation catalyst comprises at least one of molybdenum, tungsten, nickel, platinum, or palladium. An embodiment of the invention is one, any or all of prior embodiments in this paragraph up through the first embodiment in this paragraph wherein an amount of the unsupported hydrogenation catalyst is in a range of about 10 ppmw to about 1000 ppmw. An embodiment of the invention is one, any or all of prior embodiments in this paragraph up through the first embodiment in this paragraph further comprising introducing a first additive into the second reactor. An embodiment of the invention is one, any or all of prior embodiments in this paragraph up through the first embodiment in this paragraph wherein the first additive comprises at least one of a supported or unsupported Group VIB or Group VIIB based additive, high surface area carbon, high surface area silica, and high surface area porous clay. An embodiment of the invention is one, any or all of prior embodiments in this paragraph up through the first embodiment in this paragraph wherein an amount of the first additive is in a range of about 0.1 wt % to about 10 wt %. An embodiment of the invention is one, any or all of prior embodiments in this paragraph up through the first embodiment in this paragraph wherein there are at least three reactors, and further comprising introducing a second additive into the third reactor. An embodiment of the invention is one, any or all of prior embodiments in this paragraph up through the first embodiment in this paragraph wherein the second additive comprises at least one of a high surface area carbon, silica, or alumina, and an oil soluble material containing at least one of Mo, W, and Ni. An embodiment of the invention is one, any or all of prior embodiments in this paragraph up through the first embodiment in this paragraph wherein an amount of the second additive is in a range of about 10 ppmw to about 1000 ppmw. An embodiment of the invention is one, any or all of prior embodiments in this paragraph up through the first embodiment in this paragraph wherein the first or second slurry hydrocracking conditions include at least one of a temperature of about 400° C. to about 575° C., a pressure of about 3 MPa to about 30 MPa, and a liquid hourly space velocity of less than about 4 $hr^{-1}$. An embodiment of the invention is one, any or all of prior embodiments in this paragraph up through the first embodiment in this paragraph further comprising separating the slurry hydrocracking reaction products from at least one of the unreacted hydrocarbon feed, the slurry hydrocracking catalyst, and the asphaltene reaction products.

A second embodiment of the invention is a method of reducing catalyst agglomeration in a slurry hydrocracking zone containing at least two reactors in series comprising contacting a hydrocarbon feed and a slurry hydrocracking catalyst in a first reactor under first slurry hydrocracking conditions to form a first effluent containing slurry hydrocracking reaction products, unreacted hydrocarbon feed, and the slurry hydrocracking catalyst, wherein the slurry hydrocracking catalyst comprises a metal compound comprising a metal of Groups IVB, VB, VIB, VIIB, and VIII; contacting the first effluent and an unsupported hydrogenation catalyst in a second reactor under second slurry hydrocracking conditions to form a second effluent containing the slurry hydrocracking reaction products, unreacted hydrocarbon feed, the slurry hydrocracking catalyst, and asphaltene reaction products; and separating the slurry hydrocracking reaction products from at least one of the unreacted hydrocarbon feed, the slurry hydrocracking catalyst, and the asphaltene reaction products. An embodiment of the invention is one, any or all of prior embodiments in this paragraph up through the second embodiment in this paragraph wherein the unsupported hydrogenation catalyst comprises at least one of molybdenum, tungsten, nickel, platinum, or palladium. An embodiment of the invention is one, any or all of prior embodiments in this paragraph up through the second embodiment in this paragraph wherein an amount of the unsupported hydrogenation catalyst is in a range of about 10 ppmw to about 1000 ppmw. An embodiment of the invention is one, any or all of prior embodiments in this paragraph up through the second embodiment in this paragraph further comprising introducing a first additive into the second reactor, the first additive comprising at least one of a supported or unsupported Group VIB or Group VIIB based additive, high surface area carbon, high surface area silica, and high surface area porous clay. An embodiment of the invention is one, any or all of prior embodiments in this paragraph up through the second embodiment in this paragraph wherein there are at least three reactors, and further comprising introducing a second additive into the third reactor. An embodiment of the invention is one, any or all of prior embodiments in this paragraph up through the second embodiment in this paragraph wherein the second additive comprises at least one of a high surface area carbon, silica, or alumina, and an oil soluble material containing at least one of Mo, W, and Ni, or both. An embodiment of the invention is one, any or all of prior embodiments in this paragraph up through the second embodiment in this paragraph wherein the first or second slurry hydrocracking conditions include at least one of a temperature of about 400° C. to about 575° C., a pressure of about 3 MPa to about 30 MPa, and a liquid hourly space velocity of less than about 4 $hr^{-1}$.

A third embodiment of the invention is a method of reducing catalyst agglomeration in a slurry hydrocracking zone containing at least two reactors in series comprising contacting a hydrocarbon feed and a slurry hydrocracking catalyst in a first reactor under first slurry hydrocracking conditions to form a first effluent containing slurry hydrocracking reaction products, unreacted hydrocarbon feed, and the slurry hydrocracking catalyst, wherein the slurry hydrocracking catalyst comprises a metal compound comprising a metal of Groups IVB, VB, VIB, VIIB, and VIII; contacting the first effluent and about 10 ppmw to about 1000 ppmw of an unsupported hydrogenation catalyst in a second reactor under second slurry hydrocracking conditions to form a second effluent containing the slurry hydrocracking reaction products, unreacted hydrocarbon feed, the slurry hydrocracking catalyst, and asphaltene reaction products, the unsupported hydrogenation catalyst comprising at least one of molybdenum, tungsten, nickel, platinum, or palladium; and separating the slurry hydrocracking reaction products from at least one of the unreacted hydrocarbon feed, the slurry hydrocracking catalyst, and the asphaltene reaction products.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A method of reducing catalyst agglomeration in a slurry hydrocracking zone containing at least two reactors in series comprising:
    contacting a hydrocarbon feed and a slurry hydrocracking catalyst in a first reactor under first slurry hydrocracking conditions to form a first effluent containing slurry hydrocracking reaction products, unreacted hydrocarbon feed, and the slurry hydrocracking catalyst, wherein the slurry hydrocracking catalyst agglomerates;
    contacting the first effluent and an unsupported hydrogenation catalyst in a second reactor under second slurry hydrocracking conditions to form a second effluent containing the slurry hydrocracking reaction products, unreacted hydrocarbon feed, the slurry hydrocracking catalyst, and asphaltene reaction products; and
    introducing a first additive into the second reactor, the first additive comprising at least one of a supported or unsupported Group VIB or Group VIIB based additive, high surface area carbon, high surface area silica, and high surface area porous clay.

2. The method of claim 1 wherein the slurry hydrocracking catalyst comprises a metal compound comprising a metal of Groups IVB, VB, VIB, VIIB, and VIII.

3. The method of claim 1 wherein the unsupported hydrogenation catalyst comprises at least one of molybdenum, tungsten, nickel, platinum, or palladium.

4. The method of claim 1 wherein an amount of the unsupported hydrogenation catalyst is in a range of about 10 ppmw to about 1000 ppmw.

5. The method of claim 1 wherein an amount of the first additive is in a range of about 0.1 wt. % to about 10 wt. %.

6. The method of claim 1 wherein there are at least three reactors, and further comprising introducing a second additive into the third reactor.

7. The method of claim 6 wherein the second additive comprises at least one of a high surface area carbon, silica, or alumina, and an oil soluble material containing at least one of Mo, W, and Ni.

8. The method of claim 6 wherein an amount of the second additive is in a range of about 10 ppmw to about 1000 ppmw.

9. The method of claim 1 wherein the first or second slurry hydrocracking conditions include at least one of: a temperature of about 400° C. to about 575° C., a pressure of about 3 MPa to about 30 MPa, and a liquid hourly space velocity of less than about 4 $hr^{-1}$.

10. The method of claim 1 further comprising separating the slurry hydrocracking reaction products from at least one of the unreacted hydrocarbon feed, the slurry hydrocracking catalyst, and the asphaltene reaction products.

11. A method of reducing catalyst agglomeration in a slurry hydrocracking zone containing at least two reactors in series comprising:
contacting a hydrocarbon feed and a slurry hydrocracking catalyst in a first reactor under first slurry hydrocracking conditions to form a first effluent containing slurry hydrocracking reaction products, unreacted hydrocarbon feed, and the slurry hydrocracking catalyst, wherein the slurry hydrocracking catalyst comprises a metal compound comprising a metal of Groups IVB, VB, VIB, VIIB, and VIII;
contacting the first effluent and an unsupported hydrogenation catalyst in a second reactor under second slurry hydrocracking conditions to form a second effluent containing the slurry hydrocracking reaction products, unreacted hydrocarbon feed, the slurry hydrocracking catalyst, and asphaltene reaction products;
introducing a first additive into the second reactor, the first additive comprising at least one of a supported or unsupported Group VIB or Group VIIB based additive, high surface area carbon, high surface area silica, and high surface area porous clay; and
separating the slurry hydrocracking reaction products from at least one of the unreacted hydrocarbon feed, the slurry hydrocracking catalyst, and the asphaltene reaction products.

12. The method of claim 11 wherein the unsupported hydrogenation catalyst comprises at least one of molybdenum, tungsten, nickel, platinum, or palladium.

13. The method of claim 11 wherein an amount of the unsupported hydrogenation catalyst is in a range of about 10 ppmw to about 1000 ppmw.

14. The method of claim 11 wherein there are at least three reactors, and further comprising introducing a second additive into the third reactor.

15. The method of claim 14 wherein the second additive comprises at least one of a high surface area carbon, silica, or alumina, and an oil soluble material containing at least one of Mo, W, and Ni, or both.

16. The method of claim 11 wherein the first or second slurry hydrocracking conditions include at least one of: a temperature of about 400° C. to about 575° C., a pressure of about 3 MPa to about 30 MPa, and a liquid hourly space velocity of less than about 4 $hr^{-1}$.

17. A method of reducing catalyst agglomeration in a slurry hydrocracking zone containing at least two reactors in series comprising:
contacting a hydrocarbon feed and a slurry hydrocracking catalyst in a first reactor under first slurry hydrocracking conditions to form a first effluent containing slurry hydrocracking reaction products, unreacted hydrocarbon feed, and the slurry hydrocracking catalyst, wherein the slurry hydrocracking catalyst comprises a metal compound comprising a metal of Groups IVB, VB, VIB, VIIB, and VIII;
contacting the first effluent and about 10 ppmw to about 1000 ppmw of an unsupported hydrogenation catalyst in a second reactor under second slurry hydrocracking conditions to form a second effluent containing the slurry hydrocracking reaction products, unreacted hydrocarbon feed, the slurry hydrocracking catalyst, and asphaltene reaction products, the unsupported hydrogenation catalyst comprising at least one of molybdenum, tungsten, nickel, platinum, or palladium;
introducing a first additive into the second reactor, the first additive comprising at least one of a supported or unsupported Group VIB or Group VIIB based additive, high surface area carbon, high surface area silica, and high surface area porous clay; and
separating the slurry hydrocracking reaction products from at least one of the unreacted hydrocarbon feed, the slurry hydrocracking catalyst, and the asphaltene reaction products.

* * * * *